UNITED STATES PATENT OFFICE.

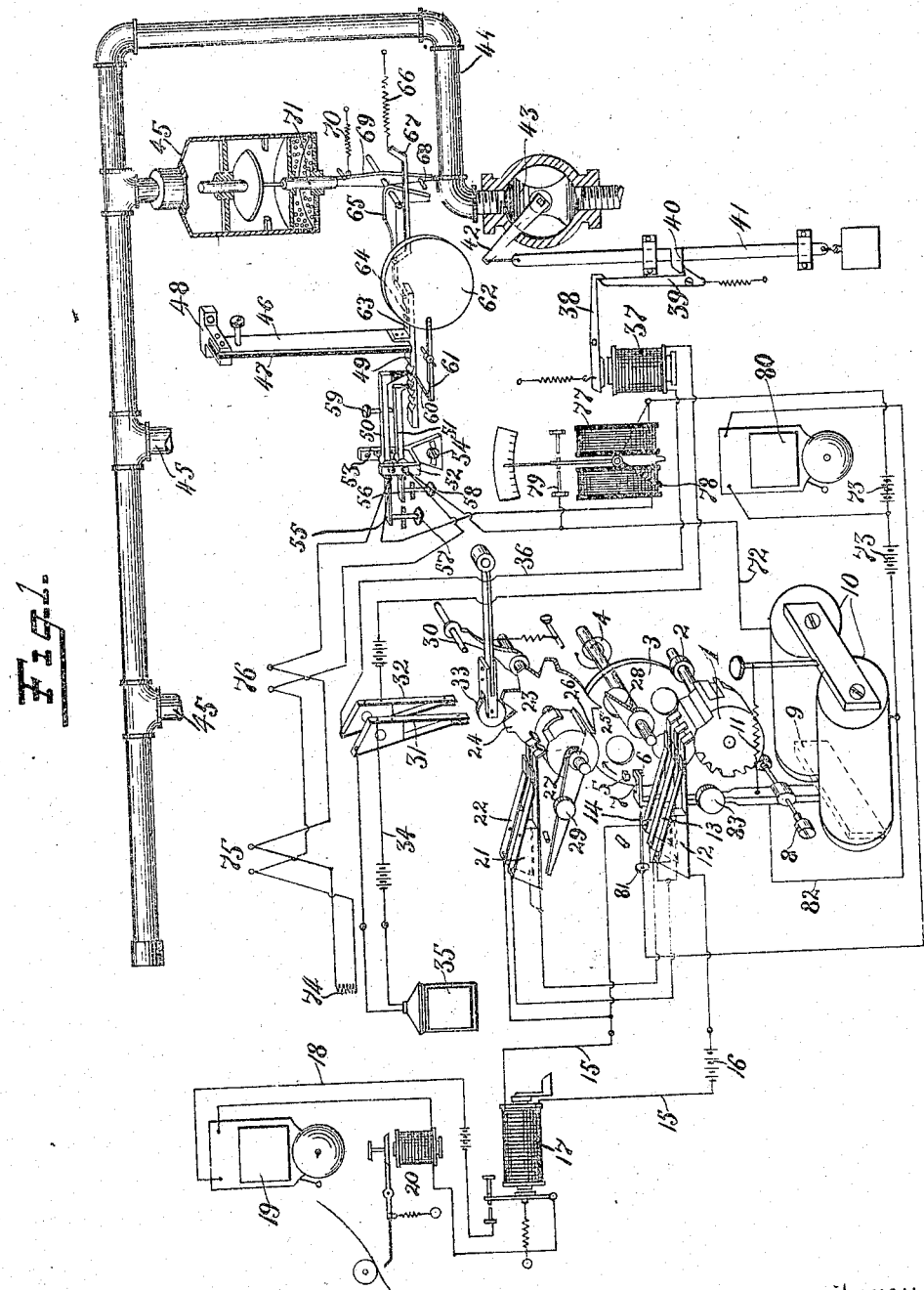

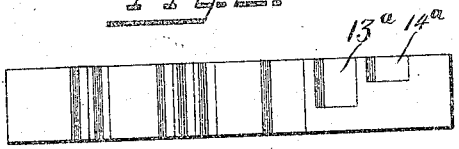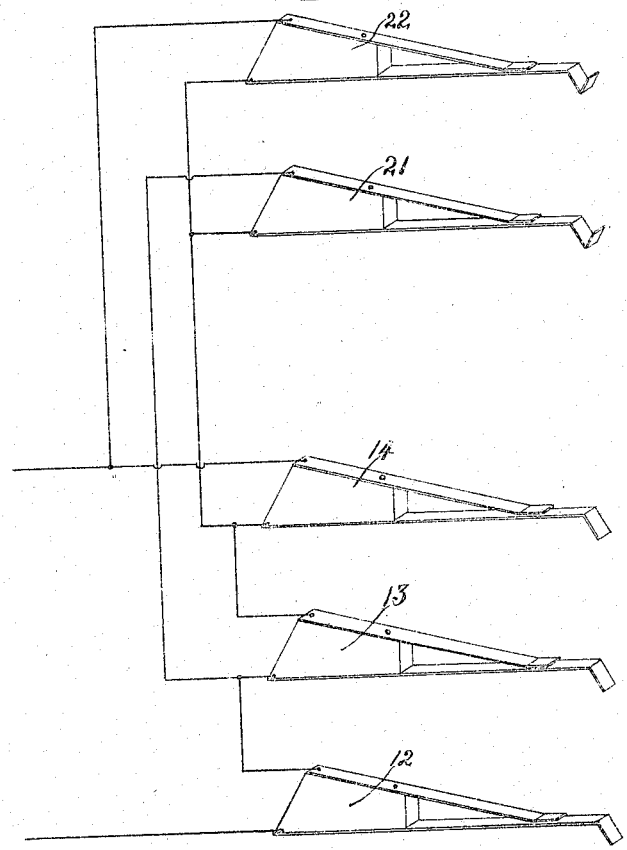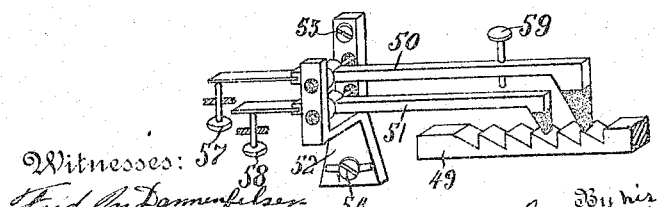

WILLIAM H. KIRNAN, OF BAYONNE, NEW JERSEY.

ELECTRIC SIGNALING FIRE-ALARM APPARATUS.

No. 930,388.  Specification of Letters Patent.  Patented Aug. 10, 1909.

Application filed November 7, 1908. Serial No. 461,452.

*To all whom it may concern:*

Be it known that I, WILLIAM H. KIRNAN, a citizen of the United States, residing at Bayonne, Hudson county, New Jersey, have invented certain new and useful Improvements in Electric Signaling Fire-Alarm Apparatus, of which the following is a full, clear, and exact description.

My invention relates to improvements in electric signaling fire alarm apparatus, and has for its object to produce such an apparatus in which a single thermostat is employed in connection with a single signal box to send a plurality of different signals over a single transmission circuit.

Another object of my invention is to provide a thermostatic circuit controller which shall be simple and accurate in its operation, so as to change the condition of the circuit controlled thereby a predetermined number of times as the temperature increases, and eliminate any possibility of undesired accidental changes in the condition of the circuit.

Another object of my invention is to provide a signal box which, after a signal of one character has been transmitted, automatically sets itself so as to transmit a different signal when next operated, the signals preferably being "warning", "danger" or "fire".

Another object of my invention is to provide means so that when the signal box is sending in a "fire" signal a call will be sent in by a street fire alarm box in addition to the signal sent in to the local receiving apparatus.

Another object of my invention is to provide a sprinkling system automatically released by the thermostat, the thermostat being controlled so as to prevent the operation of the sprinkler system until the temperature has reached a predetermined point.

Another object of my invention is to provide a semaphore actuated by the thermostat so as to indicate abnormal conditions whenever the thermostat moves so as to send in a "warning" signal.

Another object of my invention is to provide a sprinkler system in which the main leading to a plurality of sprinklers is closed by a valve common to all of said sprinklers, which valve is automatically opened when the thermostat is heated so that the apparatus sends in the "fire" signal.

Another object of my invention is to provide means for indicating the condition of the circuit controlled by the thermostat and to send in an audible alarm whenever the condition of that circuit is abnormal.

The following is a description of apparatus embodying my invention, reference being had to the accompanying drawings, in which, Figure 1 shows diagrammatically a system embodying the invention. Fig. 2 shows a development of the signal wheel employed. Fig. 3 shows the circuit connections between the controllers of the transmission circuit and certain cut-out devices. Fig. 4 shows an enlarged detail of a portion of the thermostatic circuit controller.

Referring more particularly to the drawings, 1 is the signal wheel of the multiple call signal box. 2 is a gear mounted on the shaft thereof, and 3 is a driving gear meshing with the gear 2. This driving gear when free to move is driven by any convenient driving means, such as a spring 4, in the ordinary way. The gear 3 has near its periphery a stop 5 slightly displaced circumferentially with relation thereto, and slightly further removed from the periphery is a stop 6. These stops are engaged by a detent 7 pivoted at 8, and having connected to its lower end an armature 9, which is actuated by an electro-magnet 10. This detent 7 when the electro-magnet is deënergized, is held by the spring 11 so as to lie in the path of the stop 6 upon the wheel 3. When the electro-magnet 10 is energized so as to attract its armature 9, the detent is then moved so as to lie in the path of the stop 5 upon the wheel 3. The result is, that if the electro-magnet 10 is energized when the detent is in engagement with the stop 6, the wheel 3 is released so as to permit it to revolve in the direction of the arrow. If the electro-magnet 10 becomes deënergized before the wheel 3 revolves sufficiently to cause the stop 5 to engage the detent 7, the detent 7 is retracted by the spring 11, so that it lies in the path of the stop 6 and therefore stops the revolution of the wheel 3 when it has made one complete revolution. If the magnet 10 remains energized for a longer period than would be required for the wheel to make one revolution, the detent 7 is engaged by the stop 5 so that the wheel 3 is stopped just before a revolution is completed. The partial revolution, however, is sufficient to send in all the signals that would be sent in by a complete revolution. If at any time after the wheel has been stopped by the engagement of the stop 5 with the detent 7, the magnet 10 becomes deënergized, the detent 7 is moved by the spring 11 out of the path of the stop 5 and into the path of the stop 6, permitting the wheel 3 to revolve a very slight distance corresponding to the position of those stops completing the incomplete revolution and placing the apparatus in condition so that when the magnet 10 is again energized the operation just described will be repeated.

12, 13 and 14 are three circuit controllers actuated by the signal wheel 1. These circuit controllers, as shown, consist of two contacts, the lower of which is in each instance a spring contact tending to separate from its upper or companion contact and moved into engagement with the upper contact by the action of the signal wheel 1, this signal wheel having a separate contact space for each of the circuit controllers, there being different projections, or series of projections, for actuating the three circuit controllers respectively, the depressions permitting the several circuit controllers, when not short-circuited, to break the circuit 15. For convenience in manufacture, the depressions sending in the box identifying signal and one long signal, may extend way across the signal wheel. One of the other long signal notches must pass under controller 13 but not under 12 while the other long signal notch must pass under controller 14 but not under controllers 12 and 13, as shown in Figs. 1 and 2.

15 is a transmission circuit having a battery having a source of current 16, and a relay 17 controlling a local circuit 18, which contains an alarm bell 19 and a recording electromagnetic device 20, such as are usually employed in local receiving circuits.

When one or more of the three circuit controllers 12, 13 and 14 are free to act, they transmit over the circuit 15 a signal consisting of three short signals followed by two short signals, which in turn are followed by one, two or three long signals. The three short signals followed by the two short signals indicate the number 32 of the particular signal box which is being operated. The following long signals indicate "warning", "danger" and "fire", corresponding as to whether one, two or three of such long signals are sent in, which depends on whether controller 12 acts alone or whether one or both of controllers 13 and 14 are free to coöperate therewith. For other signal boxes, of course, the signal wheels will be made so as not to send in the same signal box call "32", but, on the contrary, to send in some other distinctive number. The "warning", "danger" and "fire" signals, however, would be the same and would follow up the box signal call the same as above described.

If all the controllers 12, 13 and 14 were free to control the circuit 15, the alarm which would be sent over the circuit 15 would correspond to the "fire" condition. If the controller 14 were short-circuited, the alarm which would be sent in would correspond to "danger" condition. If both the controllers 13 and 14 were short-circuited, the mechanism would send in a "warning" call. The circuit controllers 13 and 14 are normally cut out of action by short-circuiting contacts 21 and 22 connected as shown in Fig. 3. These controllers are actuated by a cam surface 23, which is driven by a toothed member 24. This toothed member has three teeth 25, 26 and 27, one of which is engaged by a pawl 28 attached to the shaft of the gear 3, upon each revolution of said gear. The parts are normally in the position shown in Fig. 1, having been moved to that position by the handle 29. When the gear 3 begins to revolve with the parts in the position shown in Fig. 1, it will, near the end of its first revolution, cause the pawl 28 to engage the tooth 25 and move the member 24, together with the cam surface 23, one step, with the result that the bearing portion of the short-circuiting device 21 comes upon a depressed portion of the cam surface 23, permitting the engaging members of the short-circuiting device 21 to separate. An examination of the circuits as shown in Figs. 1 and 3 discloses the fact that under these conditions the circuit controller 13 is no longer short-circuited, and is therefore able to send in a signal corresponding to the recess 13ª, upon the signal wheel 1. When the mechanism has been operated so that the gear 3 revolves a second time, the pawl 28 engages the tooth 26, causing the cam surface 23 to move another step, so that the portion of the circuit controller 22 bearing thereon reaches a depressed portion thereof. This permits the engaging contacts of the device 22 to separate, and thereby breaks the short-circuit around the circuit controller 14. When the parts are in this condition, the revolution of the signal wheel sends in a signal, in the producing of which the recess 14ª performs a part, the signal being sent corresponding to the "fire" signal above referred to. During the latter part of the revolution of the wheel 3, while it is sending in the "fire" signal, the pawl 28 engages the tooth 27 and moves the shaft on which the device 24 is mounted, to a still more advanced position. This shaft carries a bar 30, which, by the movement due to the engagement of the pawl 28 with the tooth 27 is moved so as to cause spring contacts 31—32 to engage other contacts, completing circuits for purposes hereinafter described.

33 is a roller detent engaging notches in the toothed member 24 so as to insure the movement of that member to a complete step and hold it yieldingly in the position to which it has been moved.

The spring contact 31 controls a local circuit 34, in which is located a street fire alarm box 35. The spring contact 32 controls a local circuit 36, which actuates an electromagnet 37, the armature of which is connected to a pawl 38, which in turn engages a pawl 39. The pawl 39 engages a projection 40 upon a weighted rod 41, which rod is connected to the arm 42 of a valve 43 in the main supply pipe 44 connected to the sprinklers 45 of the system. When the circuit is made by the movement of the spring contact 32, the magnet is energized and the bar 41 released, so that the valve 43 is opened, permitting the water to flow to all the sprinkler valves. The individual sprinkler valves, however, are not opened and will not be opened until the particular thermostat corresponding to a particular sprinkler valve is heated sufficiently to open that valve. The purpose of having the water cut off by the main valve 43 is in order to do away with the danger of freezing, since it has been found that where the water remains in the pipes of the sprinkler system it is liable to freeze, particularly in unheated lofts, storehouses and the like.

46 and 47 are the two members of a thermostat consisting preferably of zinc or steel and hard rubber connected together at the top and supported by bracket 48 and having their ends connected to a toothed member 49. Upon this toothed member there are two pawls 50 and 51, mounted in insulating bearings in a yoke 52. This yoke is pivotally supported at 53 and has a slot at its lower end, through which passes a screw 54, so that the yoke may be adjusted circumferentially about the pivotal support 53. The pawls 50 and 51 have spring extensions 55 and 56, which are engaged by adjusting screws 57 and 58 so as to keep the forward ends of the pawls in engagement with the toothed member 49. One of the pawls has an adjustable contact screw 59, the lower end of which engages with the lower pawl 51. The two pawls 50 and 51 and the rack 49 are so proportioned and located relatively to one another that the pawls are out of step, that is, so that when the rack 49 is moved the pawls 50 and 51 will leave the teeth with which they are in engagement at different times. When the pawl 50 engages the first tooth, as shown in Figs. 1 and 4, the parts are so related that as the toothed member 49 moves the pawl 50 will escape from its tooth first. This causes the contact 59 to engage the pawl 51 and form an electrical connection between them for the purpose hereinafter stated. When the pawl 50 is engaging the second tooth and the pawl 51 is engaging the third tooth, and the rack 49 is moved still farther to the right, the first action will be for the pawl 51 to escape from its tooth, thereby breaking the electrical engagement between the contact 59 and the pawl 51. As the toothed member 49 moves still farther to the right, the electrical engagement is made again and then broken again, and the operation can be still further repeated. Whenever the electrical engagement is made or broken, one of the pawls acts to prevent the toothed member from moving to the left. The pawls when once in engagement, remain in engagement until the pawl 51 escapes its tooth, never mind how the toothed member 49 may move by reason of varying degrees of temperature or accident. There is, therefore, absolutely no danger of having the electrical engagement between the members 50 and 51 made and broken, except when the conditions are such that it is desired that they should be made and broken. The pivotal adjustment of the yoke 52 permits the relative relations of the pawls 50 and 51 to the rack 49 to be varied. Thus, as the yoke 52 is moved in either direction, the movement of the pawl 50 will be less than the movement of the pawl 51, and their relations to the rack 49 and also the degree to which they are out of step, can be thus modified.

The thermostat carries a projection 60, which, when the rack 49 moves so as to disengage the pawl 50 from the first tooth, comes over a notch 61 in the arm of a pivoted semaphore 62, permitting the semaphore to swing about its pivot and thereby indicate that the thermostat has been actuated so as to move its rack into the second or "warning" position.

The thermostat has a projection 63 carried thereby, having a notch 64, which, as the thermostat moves, comes into the path of a projection on the hammer 65. This hammer is actuated by a spring 66 connected thereto by a link 67. When the thermostat moves to the "fire" position, the notch 64 releases the hammer 65, permitting it to hit the pin 68 upon a pivoted restraining member 69, which blow, overcomes the spring 70 and causes the restraining member to disengage the valve stem 71 of the sprinkler 45, and thereby permit the valve of the sprinkler head to open. The spring 70 normally tends to hold the member 69 beneath the valve stem 71.

Leading from the electro-magnet 10 is a circuit 72 having a source of current 73 in series with the resistance 74. The pawl 50 is electrically connected to one branch of this circuit and the pawl 51 is electrically connected to the other branch of this circuit, with the result that when these two pawls are in electrical engagement the resistance 74 is short-circuited. Similar pawls controlled by similar thermostats are connected at various points, as desired, along the circuit 72, as, for instance, at 75 and 76. When the pawls 50 and 51 are brought into electrical engagement through the action of the thermostat, the current through the electro-magnet 10 increases on account of the resistance 74 being cut out, with the result that the electro-magnet 10, which theretofore was practically deënergized, becomes energized sufficiently to attract its armature 9 and actuate the detent 7, with the results heretofore described. When the toothed member 49 moves still farther to the left, under the influence of the thermostat, the electrical engagement between the pawls 50 and 51 is broken, the electro-magnet 10 becomes practically deënergized, and the detent 7 is brought into the path of the projection 6 upon the wheel 3. Upon each successive predetermined degree of temperature rise, the electrical engagement between the pawls 50 and 51 is made and broken in a similar manner and the detent 7 actuated accordingly and the signal mechanism put in operation. As before described, the first signal will be a "warning" signal sent in through the action of the circuit controller 12 alone. This signal will be repeated a number of times, corresponding to the ratio of diameters of the gears 2 and 3, which is preferably a ratio of one to four. When the rack 49 reaches the next contact making, or "danger" position, the circuit controllers 12 and 13 coact in sending in the signal, and the signal is the characteristic "danger" signal. When the thermostat has reached the third contact making position, all three circuit controllers 12, 13 and 14 coact in sending in the signal, and the signal sent in is the "fire" signal.

In order to indicate abnormal conditions in the circuit 72, such as the accidental opening of the circuit, I place in the circuit a galvanometer 77 whose needle is slightly counterbalanced by an arm 78. When no current is flowing, the galvanometer needle is moved to the left, causing an engagement to be made with the contact 79. When the current is flowing through the galvanometer, the galvanometer needle is held away from the contact 79. The contact 79 is connected to one branch of the circuit 72, and the galvanometer needle is connected electrically to the other branch of the circuit between the galvanometer coils and the battery 73, so that, when the electrical engagement is made between the needle and the stop 79, any break beyond the points where the stop 79 and galvanometer needle are connected would be short-circuited. In order to cause such engagement to operate a signal, I place an electric bell 80 in circuit with at least a portion of the battery 73, the other terminal of the bell being connected to a contact 81, which is engaged by the detent 7 when the electro-magnet 10 is energized. The detent 7 is connected by the branch conductor 82 with the circuit in which the battery 73 is included, with the result that when the contact 79 is engaged by the galvanometer needle the magnet 10 is energized so as to retract the detent 7, until it engages with the contact 81 and thereby establishes a circuit through at least a part of the electric battery 73, causing the bell to ring. The engagement of the contact 79 and the galvanometer needle, however, causes the magnet 10 to be energized, so that when the contact 79 is engaged, the magnet 10 will always be energized and the circuit through the bell 80 will be a complete circuit. The energizing of the magnet 10 not only completes the circuit through the bell 80, but, as before explained, releases the wheel 3, causing the signal wheel 1 to send in a "warning" call over the transmission circuit to the local receiving circuit.

The operation of the apparatus is as follows, it being assumed that the parts are adjusted as shown in Fig. 1. When for any cause the temperature about the thermostat rises, the toothed member 49 is moved to the right until the detent 50 leaves the first tooth. This causes an electrical engagement to be made between the detent 50 and the detent 51, short-circuiting the resistance 74 in the circuit 72. This energizes the magnet 10 so as to actuate its armature 9 and cause the detent 7 to release the stop 6 upon the wheel 3. Thereupon the wheel 3 revolves and the signal wheel 1 actuates the circuit-controller 12 so as to send a warning call over the transmission circuit 15, said warning call consisting of the identification number of the box and a long dash. If the temperature about the thermostat continues to rise, the pawl 51 leaves its tooth and breaks the electrical engagement between the pawls 50 and 51 deenergizing magnet 10 and causing the wheel 3 to return to its normal position. The revolution of the wheel 3 causes the pawl 28 to engage the tooth 25 and move the toothed member 24 one step so that the short-circuiting contacts 21 are disengaged, leaving the circuit controller 13 free to act upon the next revolution of the signal wheel. Upon a further rise in temperature, the thermostat causes the toothed member 49 to move still farther to the right until electrical connection is again established between the contacts 50 and 51, whereupon the electro-magnet 10 becomes again energized and the wheel 2, together with the signal wheel, performs another cycle this time transmitting, in addition to the identification number of the box, two dashes, which is the signal for danger. During this operation the toothed member 24 has been moved still another step by the engagement of the tooth 26 so that the short-circuiting contacts 22 are disengaged, with the result that upon the next operation of the signal wheel 1, the circuit controller 14 will also be free to act. If the temperature still further rises, the engagement between the pawls 50 and 51 first breaks and subsequently is again made, whereupon the magnet 10 is again energized with the result that the wheel 3 is again released and together with the signal wheel 1 performs a third cycle. Since the circuit controller 14 is free to act during this cycle, the signal transmitted is the fire signal, consisting of the box number 32, followed by three dashes. Toward the end of this third revolution of the wheel 3, the detent 28 engages the third tooth 27 upon the toothed member 24, and causes the bar 30 to actuate the contacts 31 and 32 so as to cause the circuit through said alarm box and also through the main valve releasing magnet 37. When the bar 49 has reached the "fire" position, the hammer 65 is released by reason of the notch 64, and the support for the valve 71 is removed, with the result that the valve in the sprinkler is open as well as the main valve 43 in the supply pipe.

The semaphore 62 is released when the bar 49 moves to warning position so that whenever a thermostat acts so as to send in a call, its semaphore 62 will indicate that it has so acted.

In case the circuit 72 is interrupted in any of its remote points, the galvanometer 77, which is in series therewith, becomes deënergized and its needle is brought over so as to engage with the contact 79, thereby completing the circuit through the magnet 10, causing the same to be energized so as to actuate its armature 9. The movement of the armature 9, together with the engagement of the contact 81 and the contact 79, establishes a circuit through the electric bell 80 so that the bell sounds whenever the circuit 72 is open at a remote point. The energizing of the magnet 10 by the action of the galvanometer 77 also causes the wheel 1 to transmit the ordinary "warning" signal over the circuit 15.

The resistance 74 is such that the current passing through it when the circuits are complete is sufficient to balance the arm 78 of the galvanometer 77 so as to cause the contact 79 to be disengaged, but is not sufficient to have any appreciable effect upon the electromagnet 10, that is, the current flowing through the resistance 74 is not sufficient to hold the armature 9 in attracted position at any time. Under normal conditions the magnet 10 is always practically deënergized.

Where the toothed member 49 is made of conducting material, the parts of the pawls 50 and 51 therein should be made of insulating material, as shown in black, so that their engagement with the toothed member 49 will not establish an electrical connection between their conducting portions.

It is to be understood that whenever a "warning" call is sent in, it is the duty of some person to investigate the system and ascertain the cause of the trouble whether other calls are sent in or not. The person who thus investigates ascertains the trouble. In case the call is sent in through the thermostat controller, he ascertains the cause of the rise in temperature and sees that it is removed. In case it is sent in because of the break of the circuit 72, he repairs the break. Whatever the cause, he sees to it that after the cause is removed the parts are manually restored to the positions shown in Fig. 1 so as to be ready for the sending in of a new "warning" call for any other abnormal condition of the system or its surroundings. The alarm system is adapted to operate with various forms of sprinklers and sprinkling systems now in use and the system as a whole is capable of various modifications without departing from the spirit and intent of my invention.

It will be seen from the foregoing that I have provided a thermostat circuit controller which is positive in its action and which will not permit accidental making and breaking of electrical engagement due to jar, vibration or other causes so as to send in undesired signals. I have further provided a single signal box which will send in a plurality of different signals for successive degrees of temperature, the sending of one signal setting the box for sending in the next signal of a different character. I have also provided means for opening the main valve in the sprinkler system whenever the "fire" signal is sent in, and at no other time. I have also provided means for actuating a street fire alarm box when a "fire" signal is sent in, and at no other time. I have also provided means so that whenever the circuit controlled by the thermostat is interrupted at a distant point, that condition will be indicated. It is further to be noted that when the handle 29 is moved downward manually to its lowermost limit and the detent 7 is moved to the left by the button 83, a fire alarm will be at once sent in manually.

What I claim is:

1. In a fire alarm system, the combination of a thermostat, an alarm box controlled thereby, a sprinkler system having a sprinkler head provided with a valve, a supply main therefor, and a supply valve in said main, said thermostat being located in proximity to said sprinkler head and adapted to open its valve, and said supply valve being electrically controlled by said box.

2. In a fire alarm system, the combination of an alarm box adapted to send in a plurality of alarms of different character, when started a corresponding number of times, a thermostat for starting said box a corresponding number of times for a predetermined increase of temperature, a sprinkler system having a supply valve and electromagnetic means controlled by said box for opening said supply valve after a plurality of cycles have been performed by said box.

3. In a fire alarm system, the combination of an alarm box adapted to send in a plurality of alarms of different character when started a corresponding number of times, a thermostat for starting said box a corresponding number of times for a predetermined increase in temperature, a sprinkler system having a supply valve and a sprinkler head supplied with a valve, said thermostat being located in proximity to said sprinkler head and adapted to open its valve, and electro-magnetic means controlled by said box for opening said supply valve after a plurality of cycles have been performed by said box.

4. In a fire alarm system, the combination of an alarm box adapted to send in a plurality of alarms of different character when started a corresponding number of times, a thermostat for starting said box a corresponding number of times for a predetermined increase in temperature, a sprinkler system having a supply valve and a sprinkler head supplied with a valve, said thermostat being located in proximity to said sprinkler head and adapted to open its valve after a plurality of cycles have been performed by said box, and electro-magnetic means controlled by said box for opening said supply valve after a plurality of cycles have been performed by said box.

5. In an alarm system, the combination of a sending circuit, a signal member, driving means therefor, a plurality of circuit controllers engaging said signal member each being differently controlled thereby, so as to each send a different signal over said sending circuit when free to act, means for cutting into electrical action one or more of said circuit controllers, said cutting-in means being actuated by said driving means, an electro-magnetic detent controlling said driving means, the circuit of said electro-magnetic detent being normally closed through a resistance, and a thermostatic circuit controller making and breaking a short circuit around said resistance for each of a plurality of predetermined successively increased temperatures, an alarm receiving relay in said sending circuit and controlled by any of said plurality of circuit controllers when free to act, and a water supply valve opened by said cutting-in means when in "fire" position.

6. In a fire alarm system, the combination of a signal wheel, a plurality of circuit controlling devices engaging therewith, each adapted to send a different signal, means for short-circuiting part of said circuit controlling devices, a relay controlled by each of said controlling devices when free to act, a street alarm box and a water supply valve controlled by said short-circuiting means when in "fire" position, a circuit controlling said signal wheel normally closed through a resistance, a thermostat for short-circuiting said resistance, and a galvanometer in series with said resistance and balanced against the normal current flowing therethrough, and adapted to short-circuit said resistance when the current falls, and a sprinkler opened by said thermostat when in "fire" position.

7. In a fire alarm system, the combination of a sprinkler, a valve controlling the same, a thermostat, means controlled by said thermostat for sending in separate alarms for a plurality of successive increases in temperature, and means controlled by said thermostat for opening said valve after a plurality of alarms have been started.

8. In a fire alarm system, the combination of a sprinkler head, a valve in said head controlling the same, a thermostat located in proximity to said head and valve, means controlled by said thermostat for sending in separate alarms for a plurality of successive increases in temperature, and means controlled by said thermostat for opening said valve after a plurality of alarms have been started.

9. In a fire alarm system, the combination of a sprinkler head, a valve in said sprinkler head controlling the same, a main supplying said sprinkler head, a main valve therein, a thermostat, means controlled by said thermostat for sending in separate alarms for a plurality of successive increases in temperature, and means controlled by said thermostat for opening both of said valves after a plurality of alarms have been started.

W. H. KIRNAN.

Witnesses:
H. B. BROWNELL,
ALICE MORFORD.